Figure 1:
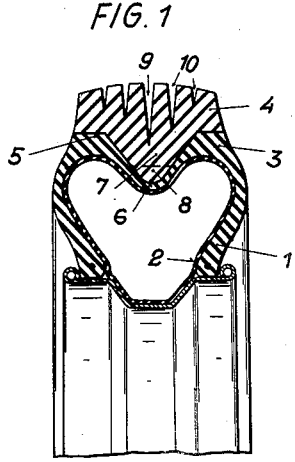

Jan. 19, 1960  L. FINDLER  2,921,617
BIPARTITE CASING FOR PNEUMATIC TIRE
Filed Nov. 15, 1955

INVENTOR:
LEOPOLD FINDLER
BY
Richardson, David and Nordon
ATTORNEYS.

United States Patent Office 2,921,617
Patented Jan. 19, 1960

2,921,617
BIPARTITE CASING FOR PNEUMATIC TIRE

Leopold Findler, Bregenz, Austria

Application November 15, 1955, Serial No. 546,908

Claims priority, application Austria November 19, 1954

1 Claim. (Cl. 152—176)

This invention relates to a casing for a pneumatic tire of the type for motor vehicles, such as automobiles and motorcycles, and for bicycles and the like.

It is a known practice to avoid the discarding of the entire casing when worn by forming the casing of two parts, viz. an inner part which engages the rim of the wheel and receives the air tube, and an outer part which carries the tread. When the tread-carrying part is worn out so as to become useless only that part needs to be replaced in order to repair the tire. When the tire has lost air, however, that known construction does not ensure a reliable connection between the two casing parts nor does it prevent a slipping off of the tread-carrying outer part or a relative movement of the two parts.

The essential feature of the invention provides a connection which is effective even after losses of air and resides in that the inner part has on its peripheral surface facing the outer part of the casing two lateral, radially outwardly projecting edge beads and a radially inwardly extending intermediate depression having a substantially V-shaped cross-section, whereas the outer part has a complementary shape.

To obtain a further improvement in the interengagement between the outer and inner parts of the casing one embodiment of the invention has an inner part which is provided with thicker portions forming the edge beads.

It is known in the art to provide between the outer and inner parts of the casing for a toothed interengagement which is effective in the peripheral direction. Due to its design and arrangement that toothed interengagement will also be effective only when full pressure is maintained in the tire.

To maintain this toothed interengagement also in the case of losses of air the invention provides for the toothed interengagement at the bottom of the intermediate depression. There the toothing is protected, does not influence the strength of the two parts of the tire casing and enables the provision of appropriately large surfaces for interengagement.

Finally the invention teaches to provide one of the two parts of the casing with radially extending plugs and the other part with corresponding receiving holes. In a preferred embodiment the plugs extend inwardly from the outer part of the casing in two rows disposed on opposite sides of the center plane of the tire and the receiving holes are arranged in radially outwardly projecting, edge bead forming thicker portions of the inner part of the casing.

This development of the two parts of the casing provides for a substantial improvement of their interengagement. The special advantage of this type of interengagement resides in the fact that in the case of losses of air a certain radial displacement between the two parts is possible without enabling a relative movement of the two casing parts in the peripheral direction or eliminating the interengagement between the two parts. The interengaging means, i.e. the plugs on the outer part of the casing and the holes in the thicker portions of the inner part of the casing can be arranged in a simple manner without reducing the stiffening effect of the edge bead forming thicker portions of the inner part of the casing.

Further details of the invention will be explained more fully with reference to the accompanying drawings, which shows diagrammatically two illustrative embodiments of the invention in a pneumatic tire, Fig. 1 being a cross-sectional view and Fig. 2 a fragmentary sectional view taken in the center plane of a tire incorporating one embodiment and Fig. 3 being a cross-sectional view of a tire incorporating the second embodiment.

Figure 2:
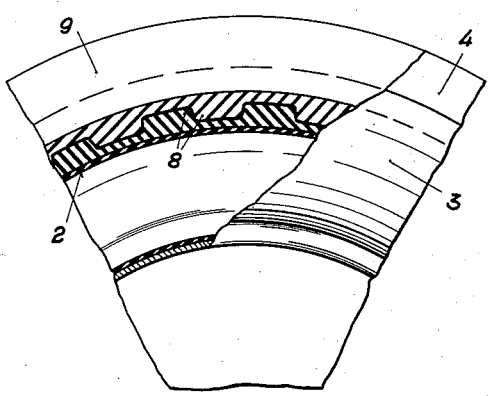

The pneumatic tire shown in Figs. 1 and 2 has a casing 1 formed like the known pneumatic tires and provided with an air tube 2. However, the casing consists of two parts, viz., an inner part 3 and an outer part 4, which carries the tread. The inner part 3 has lateral edge beads 5 and an intermediate depression 6 whereas the outer part 4 has a complementary shape. The edge beads 5 are formed more particularly by thicker portions in order to increase the strength of the casing and to maintain the desired shape. Adjacent to the intermediate depression of the inner part 3 and to the extension 7 whereby the outer part 4 enters said depression, a peripheral toothing 8 is provided to prevent a relative peripheral movement of the two parts 3 and 4. A slot 9 disposed in the center plane and additional slots 10 parallel to slot 9 extend from the tread of the part 4. As is apparent from Figs. 1 and 3, the slot 9 extends radially inwardly between the side edges of the radially inwardly facing peripheral surface of the outer part 4 into the extension 7 thereof.

Figure 3:
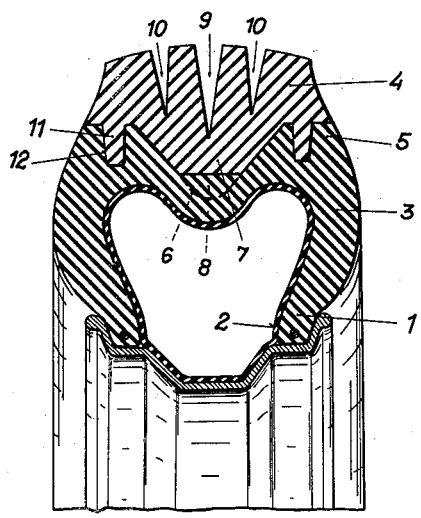

The tire according to Fig. 3 has in addition to the toothing 8 other means for interengagement between the inner part 3 and the outer part 4. These means consist of plugs 11 and holes 12. The plugs 11 are suitably arranged on the outer part 4 whereas the holes 12 are provided in the edge beads 5 of the inner part 3. Thus two rows of interengaging means are provided on opposite sides of the center plane of the tire so that a particularly good connection is ensured between the inner part 3 and the outer part 4. This connection prevents particularly any lateral or peripheral relative movement of the two parts even if the tire has lost air.

I claim:

A casing for a pneumatic tire comprising an inner part for engaging the rim of a wheel and having a pair of circumferentially extending beads, sidewalls and a tread, said tread having a centrally disposed circumferentially extending substantially V-shaped depression defining a pair of edge portions, said edge portions each having a series of circumferentially spaced holes extending radially inwardly therein, said inner part having a series of circumferentially spaced tooth-receiving openings extending radially inwardly from the apex portion of said depression, and an outer part having two circumferentially spaced rows of inwardly extending plugs, each of said plugs being receivable in one of said holes, a circumferentially extending inwardly directed portion complementarily interfitting said depression in said inner part, and a series of circumferentially spaced radially inwardly directed teeth formed integrally with said inwardly directed portion, each of said teeth being receivable in one of said tooth-receiving openings.

References Cited in the file of this patent

UNITED STATES PATENTS

| 978,549 | Bowden | Dec. 13, 1910 |
| 1,478,156 | Whitcomb | Dec. 18, 1923 |
| 1,494,621 | Ogilvie | May 20, 1924 |
| 1,597,775 | Erb | Aug. 31, 1926 |
| 2,609,026 | Luchsinger-Caballero | Sept. 2, 1952 |